(12) United States Patent
Hernandez

(10) Patent No.: US 12,425,703 B2
(45) Date of Patent: Sep. 23, 2025

(54) METHODS AND SYSTEMS FOR DETECTING AND CORRECTING STREAMING OUTAGES

(71) Applicant: CBS Interactive Inc., San Francisco, CA (US)

(72) Inventor: Alexander Hernandez, Coral Springs, FL (US)

(73) Assignee: CBS Interactive Inc., San Francisco, CA (US)

( * ) Notice: Subject to any disclaimer, the term of this patent is extended or adjusted under 35 U.S.C. 154(b) by 139 days.

(21) Appl. No.: 18/516,529

(22) Filed: Nov. 21, 2023

(65) Prior Publication Data

US 2025/0168471 A1 May 22, 2025

(51) Int. Cl.
 *H04N 7/16* (2011.01)
 *H04N 21/2662* (2011.01)
 *H04N 21/845* (2011.01)
 *H04N 21/8547* (2011.01)

(52) U.S. Cl.
 CPC ..... *H04N 21/8456* (2013.01); *H04N 21/2662* (2013.01); *H04N 21/8547* (2013.01)

(58) Field of Classification Search
 CPC ........... H04N 21/8456; H04N 21/2662; H04N 21/8547
 See application file for complete search history.

(56) References Cited

U.S. PATENT DOCUMENTS

| | | | |
|---|---|---|---|
| 7,046,693 B1 * | 5/2006 | Lapointe | H04L 43/50 370/468 |
| 2007/0174840 A1 | 7/2007 | Sharma et al. | |
| 2007/0280301 A1 * | 12/2007 | Yamanaka | H04N 21/434 370/503 |
| 2008/0181099 A1 | 7/2008 | Torab et al. | |
| 2009/0031174 A1 | 1/2009 | Moon | |
| 2010/0238815 A1 | 9/2010 | Kohout et al. | |
| 2014/0359036 A1 * | 12/2014 | Blakers | G06Q 40/04 709/206 |
| 2015/0312301 A1 * | 10/2015 | Dasher | H04L 1/0014 709/217 |
| 2019/0272016 A1 | 9/2019 | Frias et al. | |
| 2020/0133688 A1 | 4/2020 | Shinde et al. | |
| 2020/0209936 A1 | 7/2020 | Sharma et al. | |
| 2020/0260144 A1 * | 8/2020 | Salisbury | H04N 21/23439 |
| 2022/0027482 A1 | 1/2022 | Chen et al. | |

* cited by examiner

*Primary Examiner* — Gigi L Dubasky

(74) *Attorney, Agent, or Firm* — Knobbe, Martens, Olson & Bear LLP

(57) ABSTRACT

Methods and systems are disclosed configured to detect and correct content streaming outages. Streaming segments are monitored. A real time determination is made via data associated with the monitored streaming segments, sources of the streaming segments. A determination is made of an amount of time has passed since a streaming segment has been received from a first source. A determination or an inference is made as to whether a second streaming segment from the first source was scheduled for streaming during the time that has passed. At least partly in response to determining that the amount of time has passed and to determining or inferring that the second streaming segment from the first source was scheduled for streaming during the threshold amount of time after the streaming segment has been received from the first source, a corrective action is initiated to reestablish streaming of segments from the first source.

24 Claims, 11 Drawing Sheets

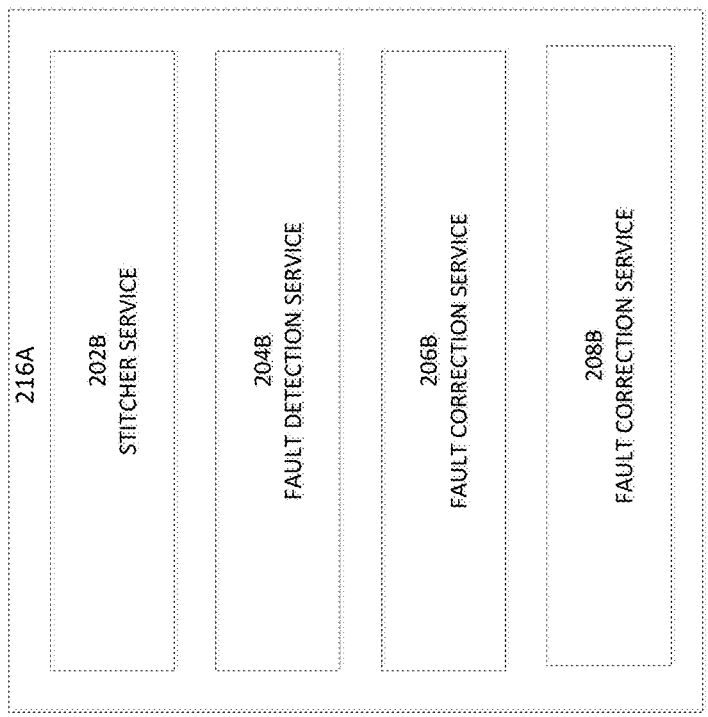

METHODS AND SYSTEMS FOR DETECTING AND CORRECTING STREAMING OUTAGES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field

The present disclosure is related to video content streaming.

Description of the Related Art

Streaming media has become an important mechanism for delivering video content to users. However, often items of content come from multiple sources, which then need to be "stitched" together by a stitcher system, which then streams the stitched together content to a client video player. Disadvantageously, technical problems may occur that interrupt the streaming from a given source, which may result in "dead" air (a period where no video content is played) occurring when content from the given source is supposed to be streamed to the client video player. Conventionally, such outages may not be detected at all or may not be detected until many hours or days after the outage occurred. Hence, the correction of such technical problems may not occur at all or may not occur until many users experienced dead air and failed to receive certain video content.

BRIEF DESCRIPTION OF THE DRAWINGS

FIG. 2B illustrates example modules and services of the content streaming system.

Figure 1:
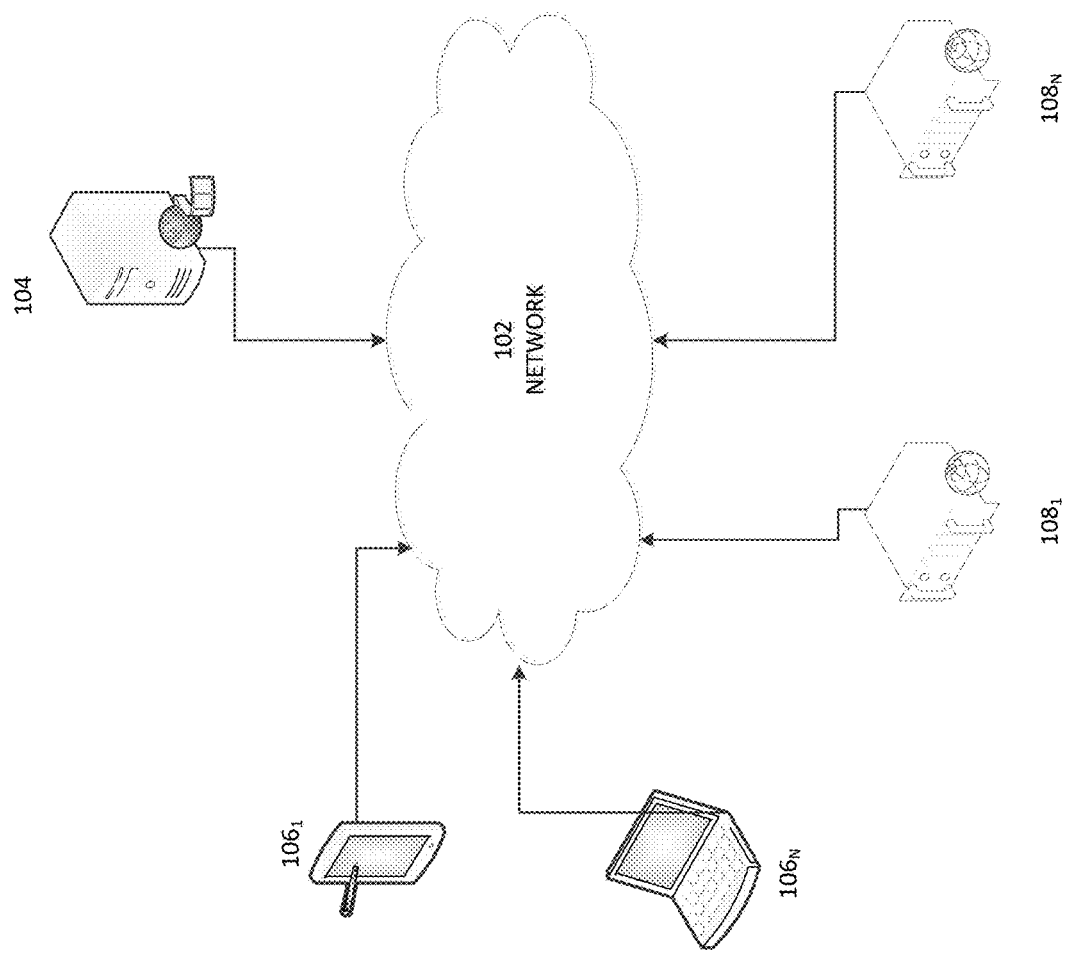
FIG. 1 illustrates an example networked environment.

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

The present disclosure describes systems and processes that overcome the above described technical problems as well as the drawbacks of conventional approaches to streaming content to user devices. It is understood that the various aspects disclosed herein may be utilized together (e.g., via common system(s)) or separately.

As similarly discussed elsewhere herein, streaming media has become an important mechanism for delivering video content to users. However, often items of content (e.g., primary content, such as movies or programs, and ancillary content, such as advertisements, station announcements, or other content) come from multiple sources, which then need to be "stitched" together by a stitcher service, which then enables the stitched content to be streamed to a client. Disadvantageously, technical problems may occur that interrupt the streaming from a given source, which may result in "dead" air (a period where no video content is played, although a notification, such as "We are in a commercial break, we will be back shortly", or a station announcement, may be displayed) occurring when content from the given source is to be streamed to the client video player. Conventionally, such outages may not be detected at all or may not be detected until many hours or days after the outage occurred. Hence, the correction of such technical problems may not occur at all or may not occur until many users experienced dead air and failed to receive certain streaming media.

Described herein are technical solutions to detecting and correcting the foregoing streaming outages. Such detection may be performed in real time. The correction of such streaming outages may optionally also be initiated in real time.

By way of example, streaming outages may be caused by one or more of the following technical problems: a messaging service crash, a server crash, a network interface failure, and/or the like.

An aspect relates to monitoring in real time source identifiers associated with respective segments of streaming content from content sources. For example, headers associated with an item of streaming content may identify the streaming content source. Certain sources are associated with a specific type of content, such as ads, while other sources are associated with primary content. Optionally, certain types of streaming content may be identified based at least in part on streaming latencies (e.g., where advertisement segments tend to have significantly larger latencies than primary content segments as they may need to be accessed from third party sources). For example, longer latencies tend to align with the streaming advertisements. If streaming content is typically received periodically from a given source (e.g., an ad source), and no such streaming content is not received within a specified window of time, a potential fault may be identified.

If streaming content segments from a given source were not received during a time window, a determination may be made as to whether or not there is a valid reason why content was not expected during the window (e.g., because it is a live event broadcast with no ads scheduled, because there are no ad insertion markers, such as SCTE-35 markers, in the stream, or the like). At least partly in response to determining or inferring that there is not a valid reason why content was not expected during the window, a streaming correction action may be initiated. Such corrective actions may optionally include, by way of example, the restart of a messaging service, forcing the reconnection of an ad system to an ad server, initiating the reboot of a server, generating and transmitting an outage alert to one or more destinations, and/or the like. Optionally, if a first type of corrective action does not resolve the streaming outage, the first type corrective action may be repeated, or a second type of corrective action may be attempted, and if the second type of corrective action does not correct the streaming outage, a third type of corrective action may be attempted, and so on. Thus, a sequence of corrective actions may optionally be performed until the outage is resolved.

Optionally, the real time identification of the receipt of a stream from a given source may be rendered in real time in a user interface. For example, a graph may be rendered indicating, over time, each time a segment is received from an ad source. Optionally, the retrieval latency may be rendered as well, where the retrieval latency indicates how long it took to receive the segment from a source, measured from the time the segment was requested. Optionally, the rendered latency may be averaged for multiple segments to reduce the amount of data displayed. For example, the latency for all segments received in a specified time window may be averaged and rendered.

Certain aspects will now be further described.

As discussed elsewhere herein, the source of streaming content segments may be determined. Determining the source of streaming content may comprise analyzing the metadata and header information associated with the streaming content. Different techniques may be used depending on the streaming protocol or format being used. Thus, optionally, the streaming protocol may be initially determined. Common streaming protocols include HTTP, RTSP, HLS, MPEG-DASH, and the like. The protocol may be identified in many cases by the URL or the initial data packets.

For example, if the content is delivered over HTTP-based protocols, such as HTTP Live Streaming (HLS) or Dynamic Adaptive Streaming over HTTP (MPEG-DASH), the outage detecting process may examine the HTTP headers in the initial request and response. Such headers may contain information about the server, content type, and other metadata.

Certain streaming formats, such as MP3 or MP4, may include metadata tags within the stream. These tags may contain information regarding the source. The outage detecting process may examine these tags to gather information about the streaming content's source.

MPEG transport stream (TS) files are often used for broadcasting. The outage detecting process may examine the MPEG transport stream headers which may contain information about the originating network or broadcaster.

In the event that the headers or metadata do not identify the source, network packets may be captured and analyzed to obtain information about the source IP address, port numbers, and other information. Such information may be used to determine the source.

By way of background, certain streaming formats, such as DASH or HLS, use manifest files that describe the structure and location of media segments. Analyzing these manifests can provide insights into the source and the available bitrates, resolutions, and codecs. By way of background, a playlist manifest for video streaming is a structured file or document that provides information about a series of video files or segments that are part of a streaming video service. This manifest file is used by a streaming server and client devices to organize and play the video content. The manifest may contain metadata and instructions for the streaming player to request and play the video segments in the correct order. In HLS, a multivariant playlist describes a list of media playlists along with the resolution, bitrate, and other details of each rendition. A media playlist describes a list of segments or fragments of video and audio data.

A stitcher may be used to stitch certain types of content into a digital media stream.

A "stitcher" in the context of online advertising refers to a technology or software component responsible for inserting ads, typically in the form of video or audio ad content, into digital media streams (although the stitcher may be used to insert other kinds of content). This process may involve dynamically integrating advertisements into the content stream at specified ad breaks or ad-pods. For example, the stitcher may prepare the primary content, comprising a video and/or audio stream such as a podcast, live stream, or on-demand video. Advertisers may provide ad inventory, which may include the ad creatives, metadata, and targeting information. Advertisers may also specify ad formats (e.g., pre-roll, mid-roll, post-roll) and ad durations.

Before serving ads, a stitcher may interface with an ad decisioning system or ad server. This system may use targeting data and rules to determine which ads should be shown to a specific user. Ad decisioning may be based on factors such as the user's demographics, location, viewing habits, and/or the like. The stitcher, along with the ad decisioning system, conventionally schedules the ad placements, deciding when and where ads should appear within the primary content. These placements may be referred to as "ad-pods" and can be inserted at predetermined intervals, such as at the beginning, middle, or end of a video stream.

When it's time to insert an ad, the stitcher service takes the ad creative from the ad server and seamlessly integrates it into the content stream. This integration may involve replacing part of the main content or temporarily pausing it, depending on the ad format and platform.

The stitcher service may facilitate tracking and measurement of ad performance. It monitors ad impressions, click-through rates, viewability, and other relevant metrics. These metrics help advertisers assess the effectiveness of their ad campaigns and may be used to bill the advertisers for the playing of the ads.

The final content, now with ads stitched in, may be delivered to the user's device for playback. The user experiences a continuous stream with ads seamlessly integrated at the specified ad breaks. The stitcher service may also enforce policies related to ad insertion, such as ad volume limits and ad load restrictions.

However, if a requested ad is not received from the ad source (e.g., an ad server) as a result of a technical fault, rather than stitching in the ad, a station identification or other default or alternative image or text may be presented. Thus, certain content may not be successfully streamed to a user video player.

Certain example aspects will now be discussed with reference to the figures. FIG. 1 illustrates an example environment. A content composer system 104 (which may include a stitcher component, such as a stitcher server, providing stitcher services or where a stitcher system may include a content composer component, or where the content composer and the stitcher may be independent systems) is connected to a network 102 (e.g., the Internet, other wide area network, an intranet, or other network). The content composer system 104 is configured to communicate with client devices 106I . . . 106n that comprise video players. By way of example, the video player may be embedded in a webpage, may be a dedicated video player application, or may be part of a larger app (e.g., a game application, a word processing application, etc.).

For example, as described elsewhere herein, the content composer system 104 may receive a request for media from a given client device 106 in the form of a request for a playlist manifest or updates to a playlist manifest. The content composer system 104 may identify, from a file, the location and length of an interstitial pod (a time frame reserved for interstitials, wherein one or more interstitials may be needed to fill a pod), determine context information (e.g., information regarding the primary content being requested, information regarding the user, and/or other context information), solicit and select interstitial content from third parties, define customized interstitials as described herein, generate playlist manifests, and/or perform other functions described herein. The content composer system 104 and/or another system may stream requested content to the requesting device 106.

Optionally, the content composer system 104 may transmit context information to one or more interstitial source systems 1081 . . . 108n. For example, the source systems 1081 . . . 108n may optionally include ad servers, and the interstitial content may comprise ads. The interstitial source systems 1081 . . . 108n may comply with the VAST protocol. By way of further example, the interstitial source systems 1081 . . . 108n may provide public service videos, previews of upcoming programs, quizzes, news, games, and/or other content. The interstitial source systems 1081 . . . 108n may use the context information in determining what interstitial content is to be provided or offered to the requesting client device 106. Optionally, the interstitial source systems 1081 . . . 108n may submit bids to place interstitial content in association with primary content, and the content composer system 104 may evaluate the bids and optionally based at least in part on the bids, select one or more items to insert into an interstitial pod.

The content composer system 104 may include a fault detection system configured to detect and optionally attempt to correct streaming outages as described elsewhere herein. In addition, the fault detection system may be configured to detect and correct audio outages.

Figure 2A:
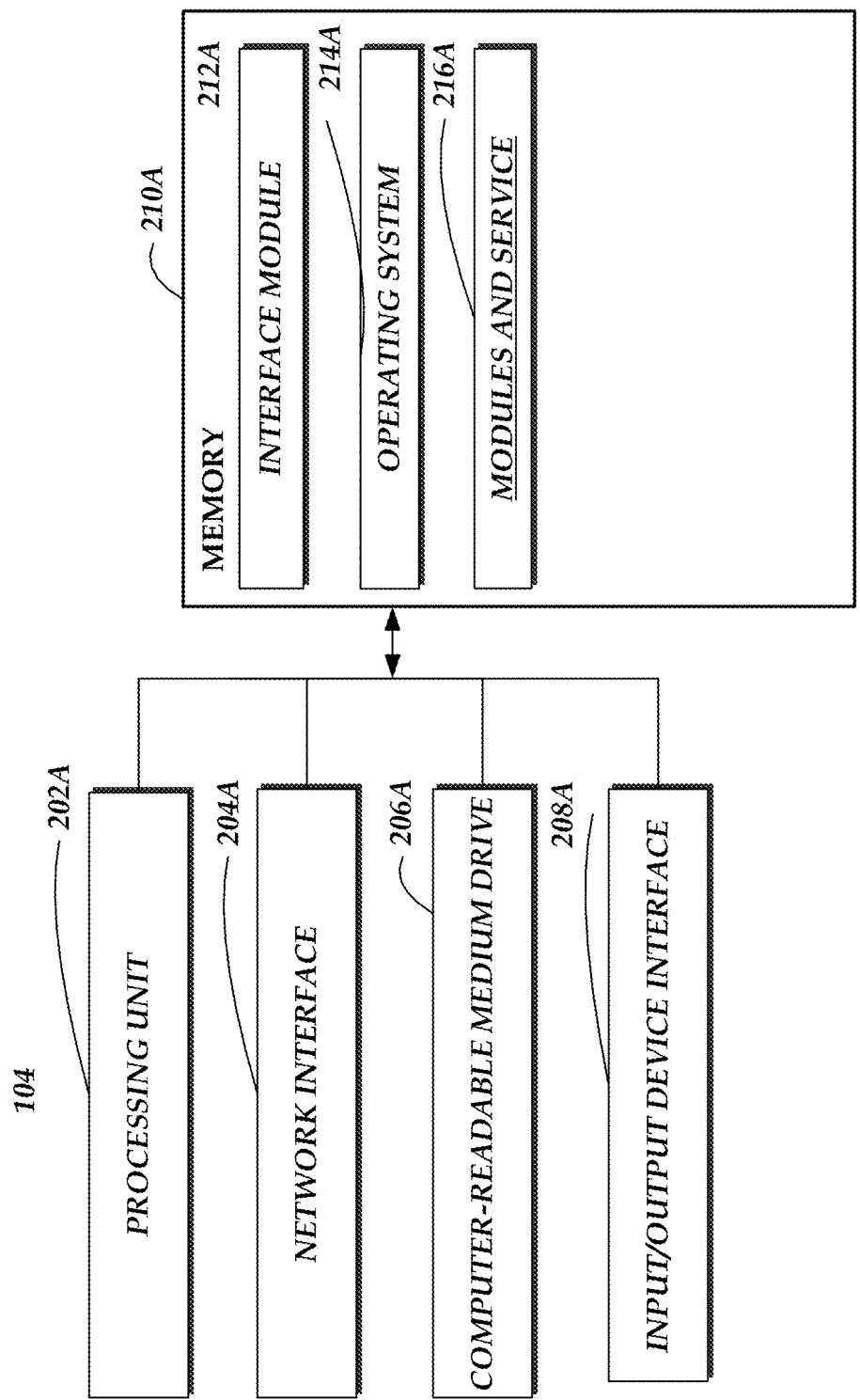
FIG. 2A is a block diagram illustrating example components of an example content streaming system.

FIG. 2A is a block diagram illustrating example components of a content composer system 104 which may host a fault detection system configured to detect and optionally attempt to correct streaming and/or audio outages as described elsewhere herein. The example content composer system 104 includes an arrangement of computer hardware and software components that may be used to implement aspects of the present disclosure. Those skilled in the art will appreciate that the example components may include more (or fewer) components than those depicted in FIG. 2A. The content composer system 104 may optionally be a cloud-based system including a hosted computing environment that includes a collection of physical computing resources that may be remotely accessible and may be rapidly provisioned as needed. Further, the content composer system 104 may include or utilize a hosted storage environment that includes a collection of physical data storage devices that may be remotely accessible and may be rapidly provisioned as needed (sometimes referred to as "cloud" storage). Such cloud storage may be utilized to store some, or all of the data, programs, and content described herein.

The content composer system 104 may include one or more processing units 202A comprising one or more processing devices (e.g., a general purpose processor, an encryption processor, a video transcoder, and/or a high speed graphics processor), one or more network interfaces 204A, a non-transitory computer-readable medium drive 206A, and an input/output device interface 208A, all of which may communicate with one another by way of one or more communication buses. The network interface 204A may provide the various services described herein with connectivity to one or more networks (e.g., the Internet, local area networks, wide area networks, personal area networks, etc.) and/or computing systems (e.g., secondary content source systems, client devices, etc.). The processing unit 202A may thus receive information, content, and instructions from other computing devices, systems, or services via a network, and may provide information, content (e.g., streaming video content, manifests, ad-pod files, content item previews, downloadable content, electronic program guides, etc.), and instructions to other computing devices, systems, or services via a network. The processing unit 202A may also communicate to and from non-transitory computer-readable medium drive 206A and memory 210A and further provide output information via the input/output device interface 208A. The input/output device interface 208A may also accept input from various input devices, such as a keyboard, mouse, digital pen, touch screen, microphone, camera, etc.

The memory 210A may contain computer program instructions that the processing unit 202A may execute to implement one or more aspects of the present disclosure. The memory 210A generally includes RAM, ROM and/or other persistent or non-transitory computer-readable storage media. The memory 210A may include cloud storage. The memory 210A may store an operating system 214A that provides computer program instructions for use by the processing unit 202A in the general administration and operation of the modules and services 216A, including its components. The modules (e.g., comprising software code) and services 216A are further discussed with respect to FIG. 2B and elsewhere herein. The memory 210A may further include other information for implementing aspects of the present disclosure.

The memory 210A may include an interface module 212A. The interface module 212A can be configured to facilitate generating one or more interfaces through which a compatible computing device may send to, or receive from, the modules and services 216A.

The modules or components described above may also include additional modules or may be implemented by computing devices that may not be depicted in FIGS. 2A and 2B. For example, although the interface module 212A and the modules and services 216A are identified in FIG. 2B as single modules, the modules may be implemented by two or more modules and in a distributed manner. By way of further example, the processing unit 202A may optionally include a general purpose processor and may optionally include a video codec.

The system 104 may offload certain compute-intensive portions of the modules and services 216A (e.g., transcoding and/or translating a stream for adaptive bitrate operations, compositing, and/or the like) to one or more dedicated devices, such as a video codec (e.g., H.264 encoders and decoders), while other code may run on a general purpose processor. The system 104 may optionally be configured to support multiple streaming protocols (e.g., HLS, MPEG DASH, etc.), may provide low latency pass-through, and may support a large number of parallel streams (e.g., HD, 4K, and/or 8K streams).

The processing unit 202A may include hundreds or thousands of core processors configured to process tasks in parallel. A GPU may include high speed memory dedicated for graphics processing tasks. As another example, the system 104 and its components can be implemented by network servers, application servers, database servers, combinations of the same, and/or the like, configured to facilitate data transmission to and from data stores, user terminals, and third party systems via one or more networks. Accordingly, the depictions of the modules, comprising software code, are illustrative in nature.

Referring to FIG. 2B the modules and services 216A may include software and/or hardware modules that provide a stitcher service 202B, a fault detection service 204B, a fault correction service 206B, and a user interface service.

As similarly discussed above, the stitcher service 202B may receive and process requests for playlist manifests from user device clients (e.g., video players). The stitcher service 202B may be configured to respond to playlist manifest requests by providing a playlist manifest (e.g., an HLS or MPEG DASH manifest) comprising manifest locators (e.g., URLs) pointing to segments of primary content and ad-pod placeholder URLs.

For example, a user device client (e.g., a video player hosted on a client device) may transmit a request for content in the form of a request for a playlist manifest (e.g., a static HLS.m3u8 or an MPEG DASH.mpd manifest file). The request may be for an item of primary content, such as a movie or episode. The request or other communication may identify user device characteristics such as device manufacturer, device model, display size (e.g., display height and width in pixels), device height/width ratio, device operating system, and/or other information.

The request for an item of content (and hence the playlist manifest) may have been triggered by the user manually clicking on a play control or other control, or the request may have been automatically issued by an application or webpage executing on the user device. For example, if the user has completed playing a first movie (or other content, such as a program episode), an application on the user device may automatically request a playlist manifest for the next scheduled movie (or other item of content).

The next scheduled item of contents may be scheduled in accordance with a program guide, where the program guide may include multiple channels (e.g., corresponding to different subject matters), where a given channel has associated programs (e.g., movies or other items of content) with scheduled start and end times. Thus, for example, a playlist manifest for a program may be automatically requested based at least in part on a comparison of the current time and the scheduled starting time for the item of content. If the difference between the current time and the scheduled starting time satisfies a threshold (which could be 0 seconds, or some larger number (e.g., 0.5, 1, or 2 seconds) to enable buffering of the program prior to the start time), the corresponding playlist manifest may be automatically requested and provided to the stitcher system.

The request from the video player on the user device for a playlist manifest may be received over a network (e.g., a wired or wireless network) by the stitcher service 202B. The location and length of secondary content pods within the requested primary content may be identified. For example, a file or other metadata associated with the primary content may be accessed that indicates the positions within the primary content for secondary content pods, wherein a given secondary content pod may have a specified length (e.g., 15 seconds, 30 seconds, 1 minute, 2 minutes, or other length). The stitcher service 202B may construct the requested playlist manifest, with locators (e.g., URLs) for the primary content and/or the secondary content (sometimes referred to herein as ancillary content).

For example, the manifest file may be an HLS.m3u8 or an MPEG DASH. mpd static manifest file. The manifest file may include locators (URLs) for each primary content and segment and may include URLs for secondary content pods (e.g., ad-pods), in the desired playback order. The manifest file may optionally include the entire playlist for the requested item of primary content.

The playlist manifest may be transmitted by the stitcher service 202B to the video player on the user device which receives the playlist manifest.

The fault detection service 204B may comprise a video player or a program module that emulates a video player so that the fault detection service 204B sees what an end user video player would see. The fault detection service 204B may be configured to determine, optionally in real time, the source of streaming content segments. For example, the fault detection service 204B may be configured to access and read source identifiers associated with respective segments of streaming content from content sources. As similarly discussed elsewhere herein, certain sources are associated with a specific type of content, such as ads, while other sources are associated with primary content. Optionally, in addition to or instead of identifying streaming content segments using header information, certain types of streaming content may be identified based at least in part on streaming latencies (e.g., where advertisement segments tend to have significantly larger latencies than primary content segments as they may need to be accessed from third party sources), or using other techniques described herein.

The fault detection service 204B may optionally be configured to access time window and/or frequency information indicating a time window within which content segment(s) of a specified type is expected or likely (e.g., more than 50% likely) or a frequency at which a content segment of a specified type is expected. The fault detection service 204B may be configured to determine whether the content segment(s) of the specified type were received within the time window or at the expected frequency.

If the fault detection service 204B determines that the content segment of the specified type was not received within the time window or at the expected frequency, the fault detection service 204B may determine whether or not there is a valid reason why content segments of the specified type were not expected during the time window or at the expected frequency (e.g., because it is a live broadcast, because there are no ad insertion markers, such as SCTE-35 markers, in the stream, because the manifest for the corresponding primary content did not include any ad-pod URLs, and/or the like). At least partly in response to determining or inferring that there is not a valid reason why streaming content segments of the specified type were not expected during the window (e.g., inferring that there was no ad scheduled during the window because of the streaming program type), a streaming fault determination may be made. If a streaming fault determination is made, the fault detection service 204B may instruct the fault correction service 206B to attempt to correct the streaming outage fault as discussed elsewhere herein.

The fault detection service 204B may also optionally determine whether there is an audio fault, wherein if audio is not present in a content stream for greater than a specified time period, the fault detection service 204B may determine there is an audio fault (e.g., caused by a failed audio component (e.g., an encoder), an incorrect configuration/setting of equipment, a lost feed or otherwise). For example, if the audio loudness (e.g., expressed as decibels) over at least a specified threshold period of time is less than a specified threshold, and if the audio does not have a frequency that is characteristic of background noise (where the presence of certain volume-related data such as low volume and background noise may indicate that the volume was purposely lowered to reduce the background noise, rather than being indicative of an audio streaming fault), a fault determination may be made. If an audio fault determination is made, the fault detection service 204B may instruct the fault correction service 206B to attempt to correct the audio fault.

If the fault correction service 206B is instructed to attempt to correct a streaming outage and/or an audio fault, the fault correction service 206B may execute one or more corrective actions. For example, the fault correction service 206B may be configured to initiate the restart of a messaging service, force the reconnection of an ad system to an ad server, reboot a streaming server, and/or transmit an outage alert to one or more destinations.

Optionally, the fault correction service 206B may be configured to determine that a given corrective action did not successfully resolve the streaming outage and/or audio fault. For example, the fault correction service 206B may continue to monitor the received streaming segments after attempting to correct the outage, and if no segments are received from the source associated with the outage for a threshold period of time, the fault correction service 206B may determine that the corrective action failed to correct the streaming outage. If, on the other hand, if segments are received from the source associated with the outage within a threshold period of time, the fault correction service 206B may determine that the corrective action succeeded in correcting the streaming outage The fault correction service 206B may further be configured to, in response to determining that the given type of corrective action did not resolve the streaming outage and/or audio fault, repeat the given corrective action, or initiate a second type of corrective action, and so on. Thus, a sequence of corrective actions may be performed until the outage is resolved or a threshold number of attempts have been made or a certain amount of time has expired.

The user interface service 208B may access data from the fault detection service 204B, such as timestamps indicating when streaming segments from one or more sources are received, corresponding latencies for the segments (optionally including latencies for different resolutions), audio frequency data, audio loudness data, and/or other data described herein. The user interface service 208B may render some or all of the foregoing data graphically and/or textually in one or more user interfaces as described elsewhere herein. Optionally, user accessible filter controls may be provided which enables the user to filter out certain segment sources and/or certain resolutions from the display. For example, via such controls, a user may specify that only the receipt of segments from a specified ad source should be displayed. This reduces network utilization with respect to the amount of data that needs to be transmitted from the user interface service 208B, and the memory utilization of the display device. Optionally, controls may be provided via which a user can control the time frame for which data is rendered. Optionally, controls may be provided via which a user can control for which streaming channels and/or for which geographical area (e.g., cities, states, regions, countries) the data is to be displayed.

Figure 3:
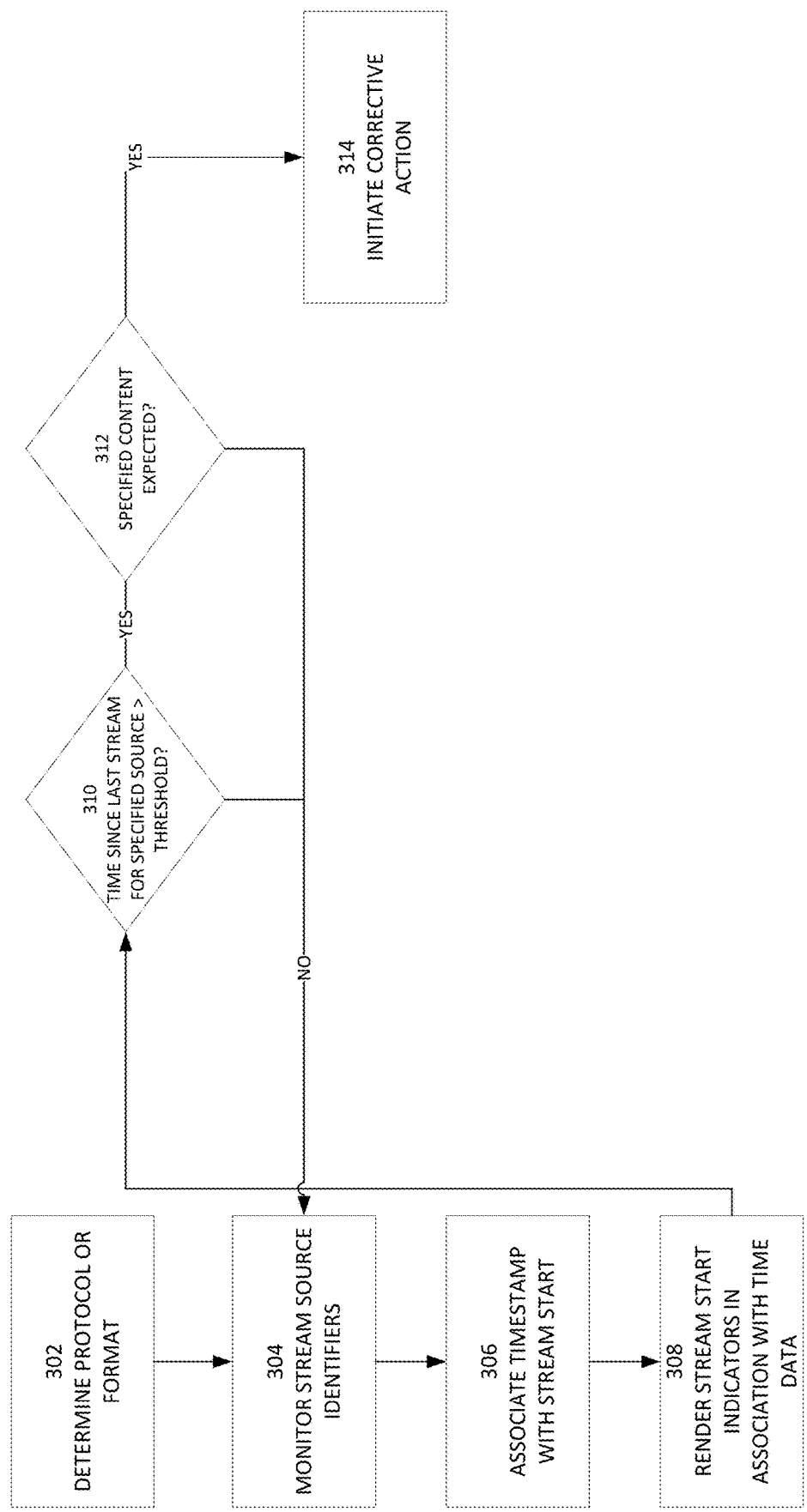
FIG. 3 illustrates an example process.

FIG. 3 illustrates an example process configured to detect and correct streaming content outages (e.g., from an ad source). At block 302, the protocol or format being used for streaming content may be determined. Knowing the protocol or format may be helpful in performing the subsequent analysis as different techniques for determining a streaming source may be used depending on the streaming protocol or format being used. Example streaming protocols include HTTP, RTSP, HLS, MPEG-DASH, and the like. The protocol may be identified by the URL or the initial data packets.

At block 304, stream identifiers for received streams may be monitored. Monitoring may be performed utilizing a software application that comprises or mimics an actual video player. For example, headers that are associated with an item of streaming content may identify the streaming content source. Certain sources are associated with a specific type of content, such as ads, while other sources are associated with primary content. For example, if the content is delivered over HTTP-based protocols, such as HTTP Live Streaming (HLS) or Dynamic Adaptive Streaming over HTTP (MPEG-DASH), the process may examine the HTTP headers in the request and response. Such headers may contain information about the server, content type, and other metadata. For certain streaming formats, such as MP3 or MP4, metadata tags identifying the source may be included within the stream. If MPEG transport stream (TS) files are being used by the streaming source, the process may examine the MPEG transport stream headers which may contain information about the originating network or broadcaster.

Optionally, network packets may be captured and analyzed to obtain information about the source IP address, port numbers, and other information which may be used to determine the source. Optionally, certain streaming content sources may be identified using streaming latencies (e.g., where advertisement segments from ad servers tend to have significantly larger latencies than primary content segments as the ad server may be remote from the primary content streaming service).

At block 306, a segment request from the streaming service may be detected and timestamped, and the receipt of the corresponding segment (if any) may be detected and timestamped. When a segment request is transmitted to a given content source, a record of such request may be stored in memory in association with a timestamp and an indication as to which content source the request was transmitted to. Similarly, when a segment request is from a given content source, a record of such receipt may be stored in memory in association with a timestamp and an indication as from which content source the segment was received from.

At block 308, optionally a user interface may be rendered via a client device comprising a display that indicates, in real time the stream segment request and/or when a content segment was received. The user interface may indicate the latency between a given request and a given received segment.

At block 310, a determination may be made as to how long it has been since a streaming segment was received from a specified source (e.g., an ad server). For example, the process may access from memory a timestamp associated with the last time a streaming segment was received from a specified source and may subtract the timestamp from the current time to determine the time period since the last streaming segment was received from a specified source. A determination may be made as to whether the time period is greater than a specified threshold of time. For example, if an ad is expected about every 12 minutes, the threshold may be set to 12 minutes or somewhat longer, such as 16 minutes. If the time period is less than the threshold, the process may continue monitoring the receipt of the streaming segments.

If the time period is greater than the threshold, at block 312, a determination may be made as to whether content from the specified source was expected during the time period or whether there is a reason, other than a technical difficulty, for not receiving a content segment from the specified source. For example, if the process determines the primary content is a live event program (e.g., an interview of a politician, certain sporting events, etc.) for a given time, the process may determine or infer (e.g., based the streaming program type, such as a live news program), that an advertisement is likely not scheduled and not to be expected during the time period. If the process determines that an advertisement is likely not scheduled or to be expected during the time period, the process may continue monitoring the receipt of the streaming segments.

If the process determines that an advertisement is likely to be expected during the time period, at block 314, the process may initiate one or more corrective actions. For example, the corrective action may comprise the restart of a service utilized in enabling the streaming of content (e.g., a messaging service) which may be initiated by a command from the content composer system to the service, initiation of a reconnection of an ad system to an ad server which may be initiated by a command from the content composer system, the reboot of a server (e.g., an ad server) which may be initiated by a command from the content composer system, restarting of a network interface which may be initiated by a command from the content composer system, and/or the transmission of an outage alert to one or more destinations. Optionally, if a first type of corrective action does not resolve the outage, the process may repeat the first type corrective action, or the process may initiate a second type of corrective action may, and so on. Thus, the process may attempt a sequence of corrective actions until the outage is resolved, or a threshold number of corrective actions have been attempted but failed to resolve the outage, or a certain amount of time has passed.

Certain example user interfaces will now be described with reference to the figures. The illustrated user interfaces and the data used to populate them may be provided via one or more of the systems described herein, such as the content composer system 104 discussed above.

Figure 4A:
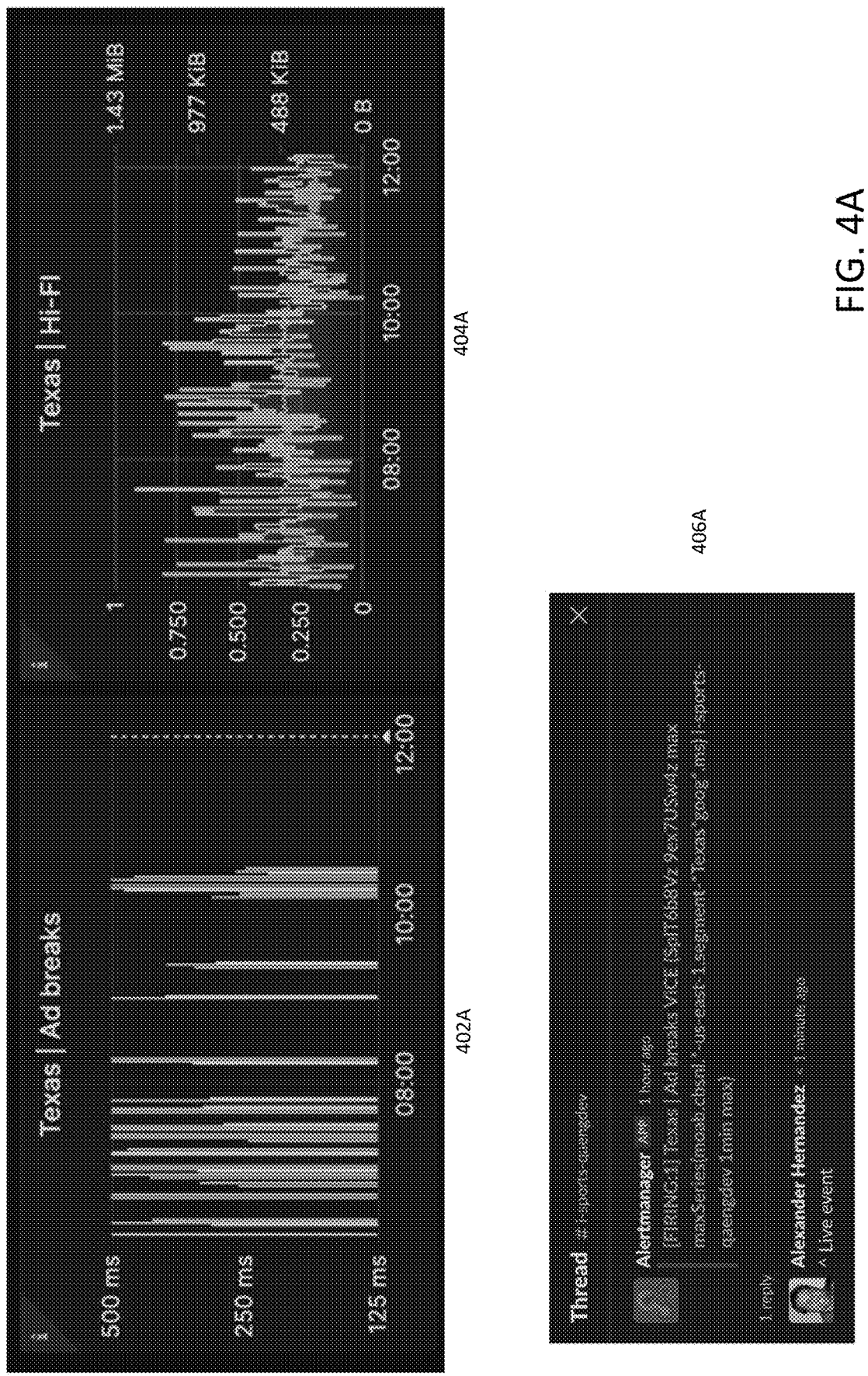
FIGS. 4A-4G illustrate example user interfaces.

Referring to FIG. 4A, a graph 402A illustrates via the vertical lines each time a streaming segment is received from a specified source (e.g., an ad service). The y-axis indicates the latency, and the x-axis indicates the time of day. The blank areas between the vertical lines indicate time periods where no segments were received from the specified source. Graph 404A indicates the segment size. Chat interface 406A indicates a generated alert indicating the failure to receive any content segments for a threshold period of time and a response providing a reason for the failure (e.g., the primary content is a live event).

Figure 4B:
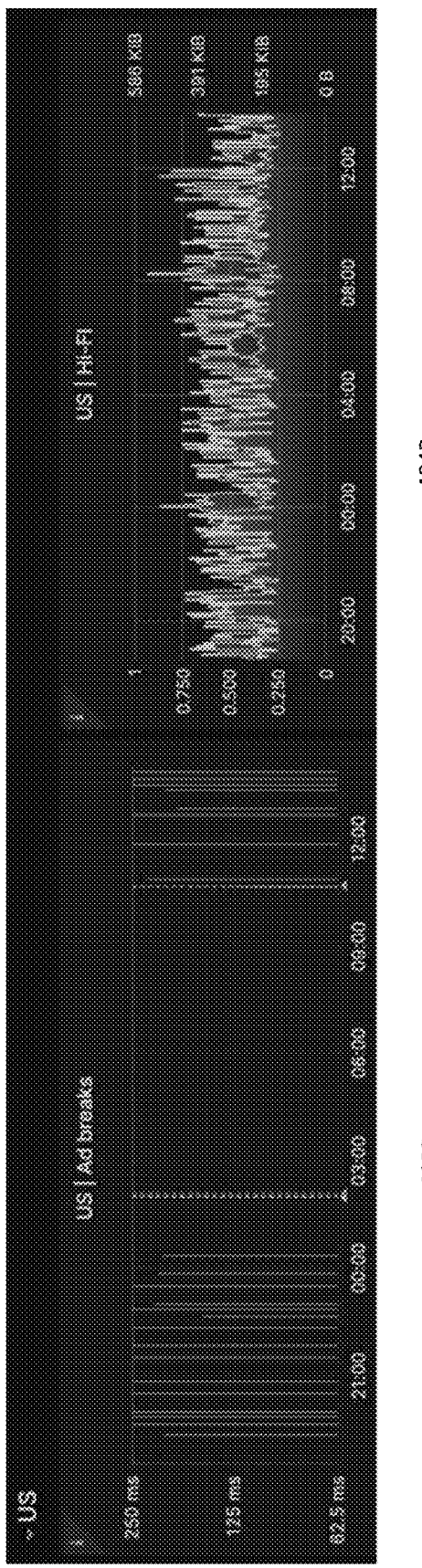

FIG. 4B illustrates graphs 402B, 404B similar to graphs 402A, 404A illustrated in FIG. 4A. However, the time window in which no streaming segments were received from a specified source (e.g., an ad service) is much longer (between about 12:30 AM and 10:30 AM).

Figure 4C:
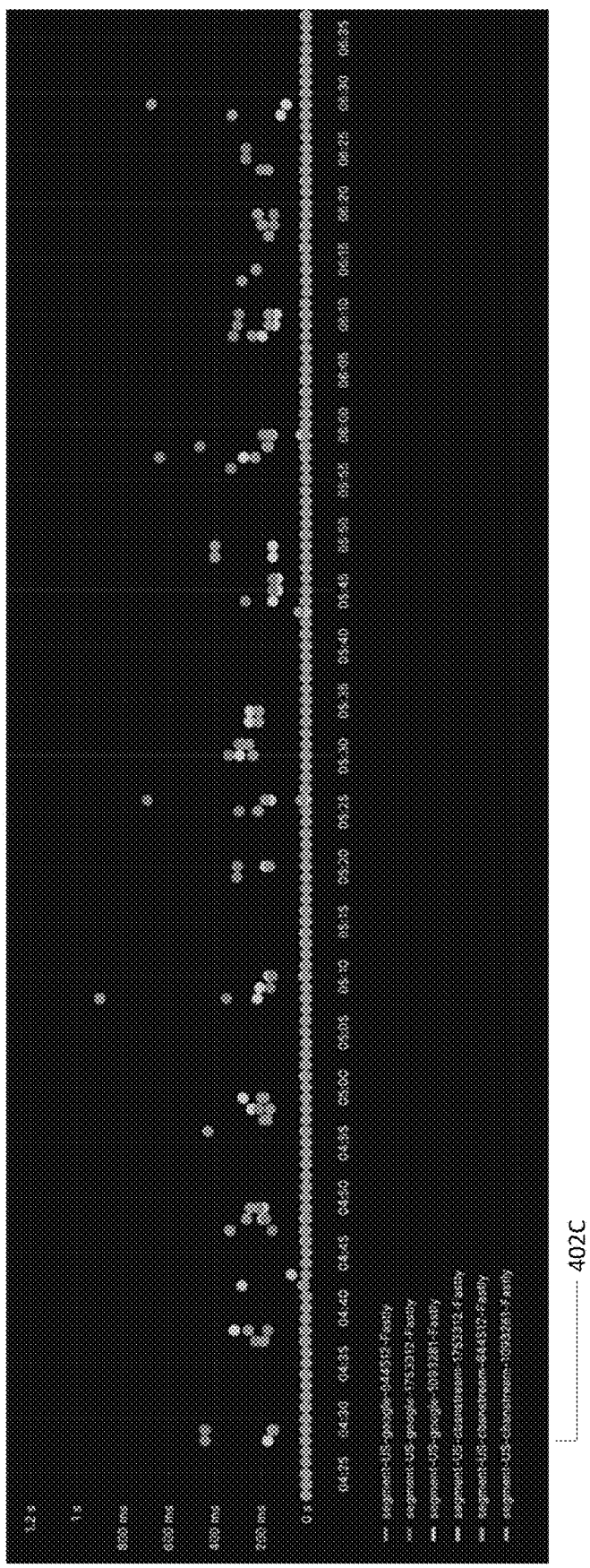

FIG. 4C illustrates segment indicators for segments received from a primary content CDN (Content Delivery Network), comprising proxy servers that are located closer to end CDN users than origin servers so that the segments can be fetched more quickly and efficiently, and ad segments from ad servers. The y-axis indicates the latency, and the x-axis indicates the time of day. The segment indicators may be color coded to indicate the source of respective segments. A listing 402C of the respective data sources for segments may be rendered in association with a color coding key and in association with an identification of the original segment source and the CDN (if any) from which the segment was received. In this example, certain ad segments were received from GOOGLE via the CDN FASTLY, and certain primary content segments were received from CBSNSTREAM via the CDN FASTLY.

Figure 4D:
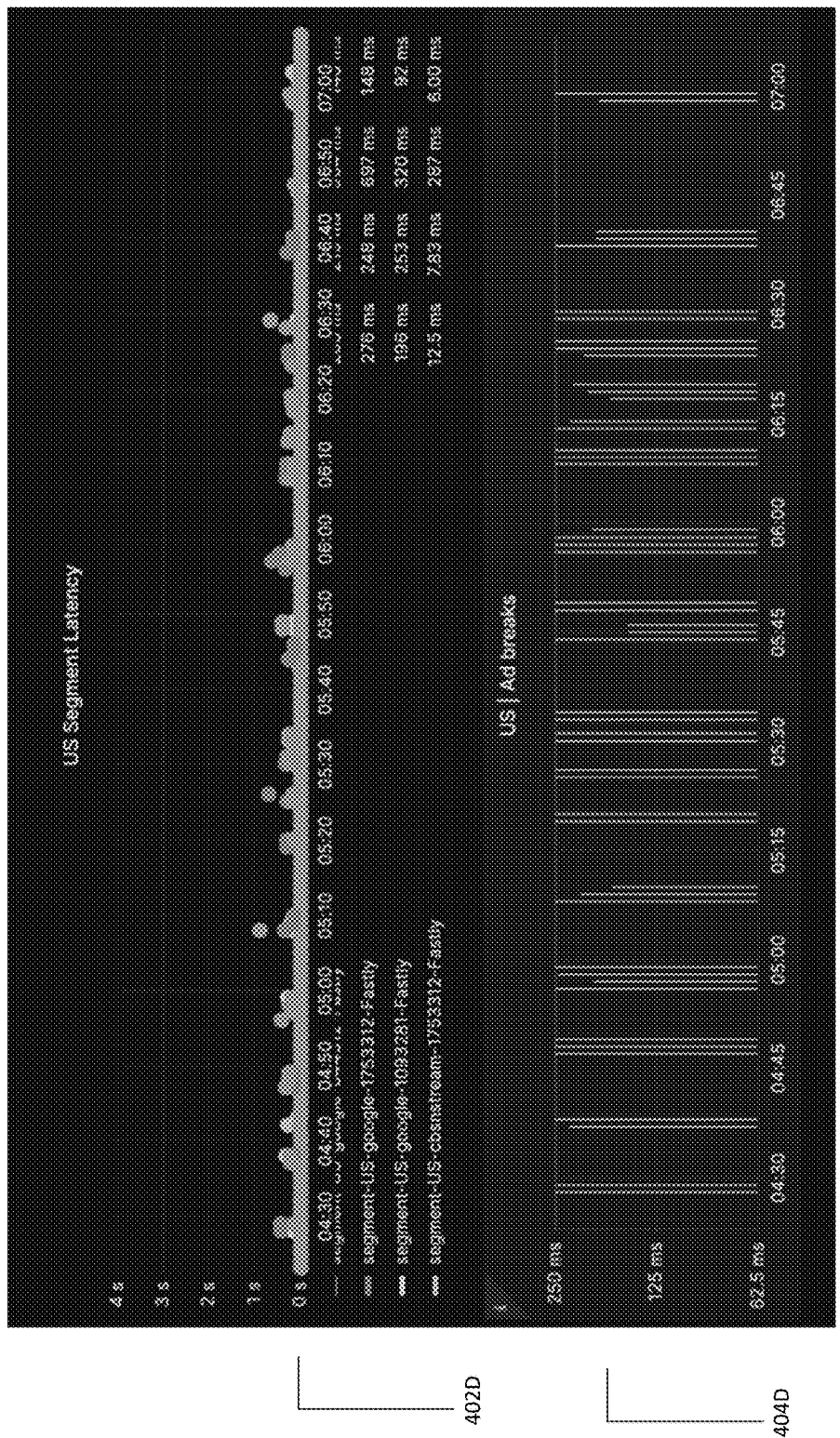

Similar to FIG. 4C, graph 402D of FIG. 4D illustrates segment indicators for segments received from a primary content CDN (Content Delivery Network), comprising proxy servers that are located closer to end CDN users than origin servers so that the segments can be fetched more quickly and efficiently, and ad segments from ad servers. In addition, similar to graph 402A illustrated in FIG. 4A, graph 404D illustrates via the vertical lines each time a streaming segment is received from a specified source (e.g., an ad service). The y-axis indicates the latency, and the x-axis indicates the time of day. The blank areas between the vertical lines indicate time periods where no segments were received from the specified source. A filter control may be provided via which the user can instruct the system to only display data from user-specified sources (e.g., just a primary content source, just an ad source, or both a primary content source and an ad source).

Figure 4E:
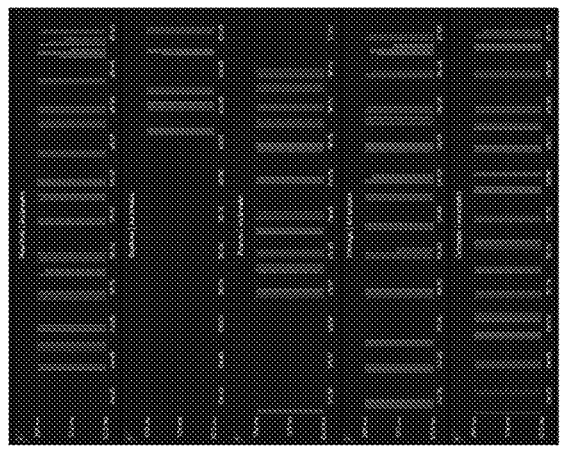
Figure 4E:
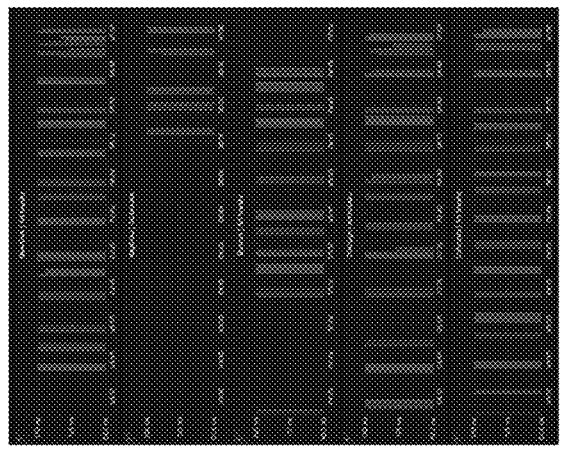
Figure 4E:
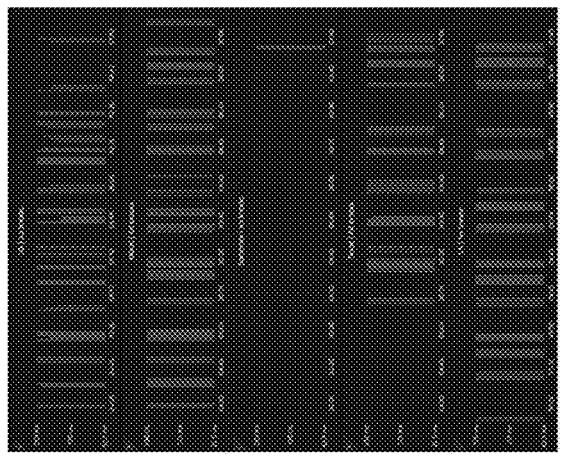

FIG. 4E illustrates graphs similar to graph 402 illustrated in FIG. 4A, except there are different graphs for different regions (e.g., different cities) so ad outages for an entire country can be viewed at the same time. A filter control may be provided via which the user can instruct the system to only display data from user-specified regions.

Figure 4F:
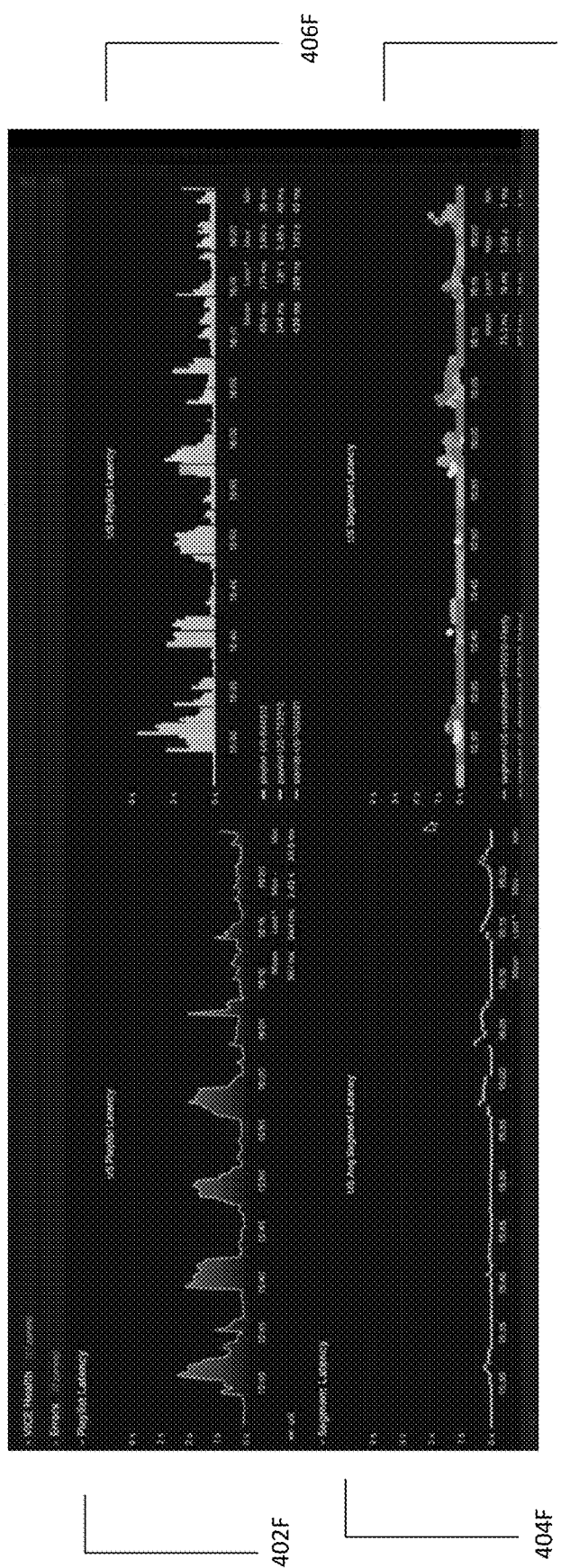

FIG. 4F illustrates a playlist latency graph 402F, an average segment latency graph 404F for a geographical area, such as an entire country, a playlist latency graph 406F where the latencies for different resolutions (e.g., 3 different resolutions) are indicated, and a segment latency graph 408F for the geographical area where the latencies for different resolutions are indicated.

Figure 4G:
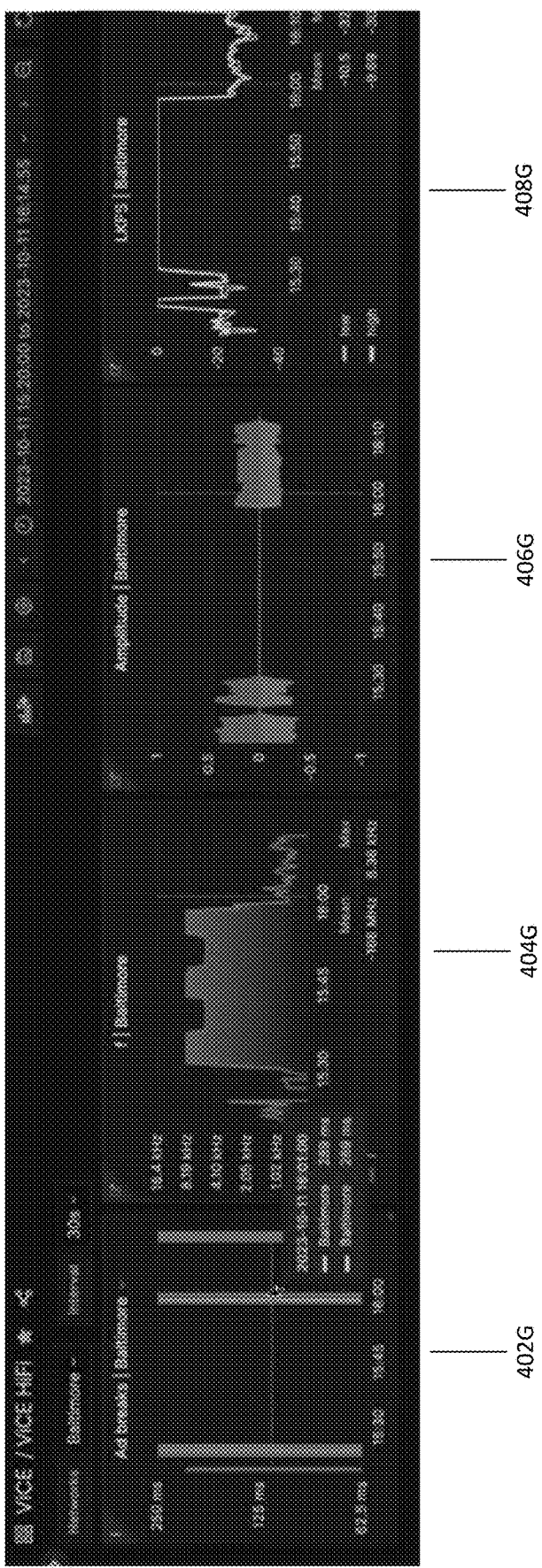

FIG. 4G illustrates a graph 402G for particular area (e.g., a city) indicating the receipt of ad segments and their latencies, a graph 404G illustrating the frequency of streaming audio, a graph 406G illustrating the amplitude of the streaming audio, and a graph 408G illustrating the Loudness, K-weighted, relative to full scale (LKFS) of the streaming audio. LKFS is a standard loudness measurement unit used for audio normalization in broadcast television systems and other video and music streaming services. The LKFS may be measured across an entire ad.

As similarly discussed elsewhere herein, if the audio loudness over at least a specified threshold period of time is less than a specified threshold, and if the audio does not have a frequency that is characteristic of background noise (where the presence of low volume and background noise may indicate that the volume was purposely lowered to reduce the background noise, rather than being indicative of an audio streaming fault), an audio fault determination may be made. In the illustrated example, graph 402G indicates that no ad segments were received for about 30 minutes (between 15:15 and 16:00), which may indicate a live program, where live programs tend to have more of any issue with background noise. The graph 404G indicates an audio frequency of about 8.19 during that time period, which indicates that there is audio generated by noise. Although the amplitude illustrated in graph 406G is low, nonetheless that is an amplitude of greater than zero, as reflected in graph 408G. Thus, from the data depicted in the graphs it can be determined by the system that even though there may be almost no discernible audio amplitude, there is not a technical failure with respect to the audio. On the other hand, if the audio frequency was zero, if ads were being streamed during the time that time, and/or if the amplitude was zero, the system may determine that there is an audio system failure, and correction may be initiated.

Thus, methods and systems are described to detect, in real time, a streaming outage. Another aspect of the present disclosure relates to the correction of such streaming outage so as to restart streaming from a given source.

An aspect of the present disclosure relates to a system configured to provide distribution of video content over a network, the system comprising: a computer device; a network interface; non-transitory computer readable memory having program instructions stored thereon that when executed by the computer device cause the system to perform operations comprising: monitor streaming segments received via the network interface; determine in real time, via associated headers, sources of the streaming segments; determine in real time if at least a threshold amount of time has passed since a streaming segment has been received from a first source by comparing a timestamp accessed from memory associated with the streaming segment with a current time; at least partly in response to determining that at least the threshold amount of time has passed since the streaming segment has been received from the first source, determine or infer whether a second streaming segment from the first source was scheduled for streaming during the threshold amount of time after the streaming segment has been received from the first source; at least partly in response to determining that at least the threshold amount of time has passed since the streaming segment has been received from the first source and to determining or inferring that the second streaming segment from the first source was scheduled for streaming during the threshold amount of time after the streaming segment has been received from the first source, initiate, in real time, a corrective action to reestablish streaming of segments from the first source.

Optionally, the corrective action comprises: restart of a messaging service, reconnection of the first source to another system, and/or reboot of a server. Optionally, the corrective action comprises generating and transmitting an outage alert to one or more destinations. Optionally, determining or inferring that the second streaming segment from the first source was scheduled for streaming during the threshold amount of time after the streaming segment has been received from the first source further comprises determining whether a live event is being streamed during the threshold amount of time. Optionally, the system comprises a video player, or a software module that emulates a video player, configured to receive streaming segments. Optionally, the operations further comprise: monitoring a frequency of streaming audio content; monitoring volume-related data of the streaming audio content; determining whether the volume-related data of the streaming audio content indicates a volume of the streaming audio content is below a first volume threshold; determining whether the frequency of streaming audio content corresponds to background noise; and at least partly in response to determining the frequency of streaming audio content does not correspond to background noise and the volume-related data of the streaming audio content indicates the volume of the streaming audio content is below the first volume threshold, determining that there is audio outage; and at least partly in response to determining that there is audio outage, initiating an action to correct the audio outage. Optionally, the operations further comprise: monitoring a frequency of streaming audio content; monitoring volume-related data of the streaming audio content; determining whether the volume-related data of the streaming audio content indicates a volume of the streaming audio content is below a first volume threshold; determining whether the frequency of streaming audio content corresponds to background noise; and at least partly in response to determining the frequency of streaming audio content corresponds to background noise determining that there is not an audio outage. Optionally, the operations further comprising: storing timestamps associated with respective received segments; storing latency data associated with respective received segments; and rendering, using the timestamps and the latency data, a graph indicating when the segments were received and the latency data associated with respective received segments.

An aspect of the present disclosure relates to a computer-implemented method, the method comprising: monitoring streaming segments received via a network interface; determining in real time using a computer system comprising one or more processors, via data associated with the monitored streaming segments, sources of the streaming segments; determining in real time, using the computer system, an amount of time has passed since a streaming segment has been received from a first source; determining or inferring, using the computer system, whether a second streaming segment from the first source was scheduled for streaming during the time that has passed since the streaming segment has been received from the first source; at least partly in response to determining that the amount of time has passed since the streaming segment has been received from the first source and to determining or inferring that the second streaming segment from the first source was scheduled for streaming during the time that has passed since the streaming segment has been received from the first source, initiating a corrective action to reestablish streaming of segments from the first source.

Optionally, the corrective action comprises: restart of a messaging service, reconnection of the first source to another system, and/or reboot of a server. Optionally, the corrective action comprises generating and transmitting an outage alert to one or more destinations. Optionally, determining or inferring that the second streaming segment from the first source was scheduled for streaming during the time that has passed since the streaming segment has been received from the first source further comprises determining whether a live event is being streamed during the time that has passed since the streaming segment has been received from the first source. Optionally, monitoring streaming segments is performed using a video player, or a software module that emulates a video player, configured to receive streaming segments. Optionally, the method further comprises: monitoring a frequency of streaming audio content; monitoring volume-related data of the streaming audio content; determining whether the volume-related data of the streaming audio content indicates a volume of the streaming audio content is below a first volume threshold; determining whether the frequency of streaming audio content corresponds to background noise; and at least partly in response to determining the frequency of streaming audio content does not correspond to background noise and the volume-related data of the streaming audio content indicates the volume of the streaming audio content is below the first volume threshold, determining that there is audio outage; and at least partly in response to determining that there is audio outage, initiating an action to correct the audio outage. Optionally, the method further comprises: monitoring a frequency of streaming audio content; monitoring volume-related data of the streaming audio content; determining whether the volume-related data of the streaming audio content indicates a volume of the streaming audio content is below a first volume threshold; determining whether the frequency of streaming audio content corresponds to background noise; and at least partly in response to determining the frequency of streaming audio content corresponds to background noise determining that there is not an audio outage. Optionally, the method further comprises: storing timestamps associated with respective received segments; storing latency data associated with respective received segments; and rendering, using the timestamps and the latency data, a graph indicating when the. segments were received and the latency data associated with respective received segments.

An aspect of the present disclosure relates to non-transitory computer readable memory having program instructions stored thereon that when executed by at least one computing device cause the at least one computing device to perform operations comprising: monitor streaming segments; determine, via data associated with the monitored streaming segments, sources of the streaming segments; determine an amount of time has passed since a streaming segment has been received from a first source; determine or infer whether a second streaming segment from the first source was scheduled for streaming during the time that has passed since the streaming segment has been received from the first source; at least partly in response to determining that the amount of time has passed since the streaming segment has been received from the first source and to determining or inferring that the second streaming segment from the first source was scheduled for streaming during the time that has passed since the streaming segment has been received from the first source, initiate a corrective action to reestablish streaming of segments from the first source.

Optionally, the corrective action comprises: restart of a messaging service, reconnection of the first source to another system, and/or reboot of a server. Optionally, the corrective action comprises generating and transmitting an outage alert to one or more destinations. Optionally, determining or inferring that the second streaming segment from the first source was scheduled for streaming during the time that has passed since the streaming segment has been received from the first source further comprises determining whether a live event is being streamed during the time that has passed since the streaming segment has been received from the first source. Optionally, monitoring streaming segments is performed using a video player, or a software module that emulates a video player, configured to receive streaming segments. Optionally, the operations further comprise: monitoring a frequency of streaming audio content; monitoring volume-related data of the streaming audio content; determining whether the volume-related data of the streaming audio content indicates a volume of the streaming audio content is below a first volume threshold; determining whether the frequency of streaming audio content corresponds to background noise; and at least partly in response to determining the frequency of streaming audio content does not correspond to background noise and the volume-related data of the streaming audio content indicates the volume of the streaming audio content is below the first volume threshold, determining that there is audio outage; and at least partly in response to determining that there is audio outage, initiating an action to correct the audio outage. Optionally, the operations further comprise: monitoring a frequency of streaming audio content; monitoring volume-related data of the streaming audio content; determining whether the volume-related data of the streaming audio content indicates a volume of the streaming audio content is below a first volume threshold; determining whether the frequency of streaming audio content corresponds to background noise; and at least partly in response to determining the frequency of streaming audio content corresponds to background noise determining that there is not an audio outage Optionally, the operations further comprise: storing timestamps associated with respective received segments; storing latency data associated with respective received segments; and rendering, using the timestamps and the latency data, a graph indicating when the segments were received and the latency data associated with respective received segments.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. A processor may include input registers, instructions registers, memory address registers, memory data registers, general processing and/or registers. The processor may include input arithmetic logic units, input and output ports, a control unit configured to control various circuits of the processor, such as the arithmetic logic unit, an address bus, a data bus, and a control bus. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop-down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc. While the above detailed description has shown, described, and pointed out novel features as applied to various embodiments, it can be understood that various omissions, substitutions, and changes in the form and details of the systems, devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to provide distribution of video content over a network, the system comprising:
   a computer device;
   a network interface;
   non-transitory computer readable memory having program instructions stored thereon that when executed by the computer device cause the system to perform operations comprising:
   monitor streaming segments received via the network interface;
   determine in real time, via associated headers, sources of the streaming segments;
   determine in real time if at least a threshold amount of time has passed since a streaming segment has been received from a first source by comparing a timestamp accessed from memory associated with the streaming segment with a current time;
   at least partly in response to determining that at least the threshold amount of time has passed since the streaming segment has been received from the first source, determine or infer whether a second streaming segment from the first source was scheduled for streaming during the threshold amount of time after the streaming segment has been received from the first source; and
   at least partly in response to determining that at least the threshold amount of time has passed since the streaming segment has been received from the first source and to determining or inferring that the second streaming segment from the first source was scheduled for streaming during the threshold amount of time after the streaming segment has been received from the first source,
   initiate, in real time, a corrective action to reestablish streaming of segments from the first source.

2. The system as defined in claim 1, wherein the corrective action comprises: restart of a messaging service, reconnection of the first source to another system, or reboot of a server.

3. The system as defined in claim 1, wherein the corrective action comprises generating and transmitting an outage alert to one or more destinations.

4. The system as defined in claim 1, wherein determining or inferring that the second streaming segment from the first source was scheduled for streaming during the threshold amount of time after the streaming segment has been received from the first source further comprises determining whether a live event is being streamed during the threshold amount of time.

5. The system as defined in claim 1, wherein the system comprises a video player, or a software module that emulates a video player, configured to receive streaming segments.

6. The system as defined in claim 1, the operations further comprising:

monitoring a frequency of streaming audio content;
monitoring volume-related data of the streaming audio content;
determining whether the volume-related data of the streaming audio content indicates a volume of the streaming audio content is below a first volume threshold;
determining whether the frequency of streaming audio content corresponds to background noise; and
at least partly in response to determining the frequency of streaming audio content does not correspond to background noise and the volume-related data of the streaming audio content indicates the volume of the streaming audio content is below the first volume threshold, determining that there is audio outage; and
at least partly in response to determining that there is audio outage, initiating an action to correct the audio outage.

7. The system as defined in claim 1, the operations further comprising:
monitoring a frequency of streaming audio content;
monitoring volume-related data of the streaming audio content;
determining whether the volume-related data of the streaming audio content indicates a volume of the streaming audio content is below a first volume threshold;
determining whether the frequency of streaming audio content corresponds to background noise; and
at least partly in response to determining the frequency of streaming audio content corresponds to background noise determining that there is not an audio outage.

8. The system as defined in claim 1, the operations further comprising:
storing timestamps associated with respective received segments;
storing latency data associated with respective received segments; and
rendering, using the timestamps and the latency data, a graph indicating when the segments were received and the latency data associated with respective received segments.

9. A computer-implemented method, the method comprising:
monitoring streaming segments received via a network interface;
determining in real time using a computer system comprising one or more processors, via data associated with the monitored streaming segments, sources of the streaming segments;
determining in real time, using the computer system, an amount of time has passed since a streaming segment has been received from a first source;
determining or inferring, using the computer system, whether a second streaming segment from the first source was scheduled for streaming during the time that has passed since the streaming segment has been received from the first source; and
at least partly in response to determining that the amount of time has passed since the streaming segment has been received from the first source and to determining or inferring that the second streaming segment from the first source was scheduled for streaming during the time that has passed since the streaming segment has been received from the first source,
initiating a corrective action to reestablish streaming of segments from the first source.

10. The computer-implemented method as defined in claim 9, wherein the corrective action comprises: restart of a messaging service, reconnection of the first source to another system, or reboot of a server.

11. The computer-implemented method as defined in claim 9, wherein the corrective action comprises generating and transmitting an outage alert to one or more destinations.

12. The computer-implemented method as defined in claim 9, wherein determining or inferring that the second streaming segment from the first source was scheduled for streaming during the time that has passed since the streaming segment has been received from the first source further comprises determining whether a live event is being streamed during the time that has passed since the streaming segment has been received from the first source.

13. The computer-implemented method as defined in claim 9, wherein monitoring streaming segments is performed using a video player, or a software module that emulates a video player, configured to receive streaming segments.

14. The computer-implemented method as defined in claim 9, the method further comprising:
monitoring a frequency of streaming audio content;
monitoring volume-related data of the streaming audio content;
determining whether the volume-related data of the streaming audio content indicates a volume of the streaming audio content is below a first volume threshold;
determining whether the frequency of streaming audio content corresponds to background noise; and
at least partly in response to determining the frequency of streaming audio content does not correspond to background noise and the volume-related data of the streaming audio content indicates the volume of the streaming audio content is below the first volume threshold, determining that there is audio outage; and
at least partly in response to determining that there is audio outage, initiating an action to correct the audio outage.

15. The computer-implemented method as defined in claim 9, the method further comprising:
monitoring a frequency of streaming audio content;
monitoring volume-related data of the streaming audio content;
determining whether the volume-related data of the streaming audio content indicates a volume of the streaming audio content is below a first volume threshold;
determining whether the frequency of streaming audio content corresponds to background noise; and
at least partly in response to determining the frequency of streaming audio content corresponds to background noise determining that there is not an audio outage.

16. The computer-implemented method as defined in claim 9, the method further comprising:
storing timestamps associated with respective received segments;
storing latency data associated with respective received segments; and
rendering, using the timestamps and the latency data, a graph indicating when the segments were received and the latency data associated with respective received segments.

17. Non-transitory computer readable memory having program instructions stored thereon that when executed by at least one computing device cause the at least one computing device to perform operations comprising:
monitor streaming segments;
determine, via data associated with the monitored streaming segments, sources of the streaming segments;
determine an amount of time has passed since a streaming segment has been received from a first source;
determine or infer whether a second streaming segment from the first source was scheduled for streaming during the time that has passed since the streaming segment has been received from the first source; and
at least partly in response to determining that the amount of time has passed since the streaming segment has been received from the first source and to determining or inferring that the second streaming segment from the first source was scheduled for streaming during the time that has passed since the streaming segment has been received from the first source,
initiate a corrective action to reestablish streaming of segments from the first source.

18. The non-transitory computer readable memory as defined in claim 17, wherein the corrective action comprises: restart of a messaging service, reconnection of the first source to another system, or reboot of a server.

19. The non-transitory computer readable memory as defined in claim 17, wherein the corrective action comprises generating and transmitting an outage alert to one or more destinations.

20. The non-transitory computer readable memory as defined in claim 17, wherein determining or inferring that the second streaming segment from the first source was scheduled for streaming during the time that has passed since the streaming segment has been received from the first source further comprises determining whether a live event is being streamed during the time that has passed since the streaming segment has been received from the first source.

21. The non-transitory computer readable memory as defined in claim 17, wherein monitoring streaming segments is performed using a video player, or a software module that emulates a video player, configured to receive streaming segments.

22. The non-transitory computer readable memory as defined in claim 17, operations further comprising:
monitoring a frequency of streaming audio content;
monitoring volume-related data of the streaming audio content;
determining whether the volume-related data of the streaming audio content indicates a volume of the streaming audio content is below a first volume threshold;
determining whether the frequency of streaming audio content corresponds to background noise; and
at least partly in response to determining the frequency of streaming audio content does not correspond to background noise and the volume-related data of the streaming audio content indicates the volume of the streaming audio content is below the first volume threshold, determining that there is audio outage; and
at least partly in response to determining that there is audio outage, initiating an action to correct the audio outage.

23. The non-transitory computer readable memory as defined in claim 17, the operations further comprising:
monitoring a frequency of streaming audio content;
monitoring volume-related data of the streaming audio content;
determining whether the volume-related data of the streaming audio content indicates a volume of the streaming audio content is below a first volume threshold;
determining whether the frequency of streaming audio content corresponds to background noise; and
at least partly in response to determining the frequency of streaming audio content corresponds to background noise determining that there is not an audio outage.

24. The non-transitory computer readable memory as defined in claim 17, the operations further comprising:
storing timestamps associated with respective received segments;
storing latency data associated with respective received segments; and
rendering, using the timestamps and the latency data, a graph indicating when the segments were received and the latency data associated with respective received segments.

* * * * *